(No Model.)  2 Sheets—Sheet 1.
J. HARRINGTON.
Bicycle.
No. 240,905. Patented May 3, 1881.
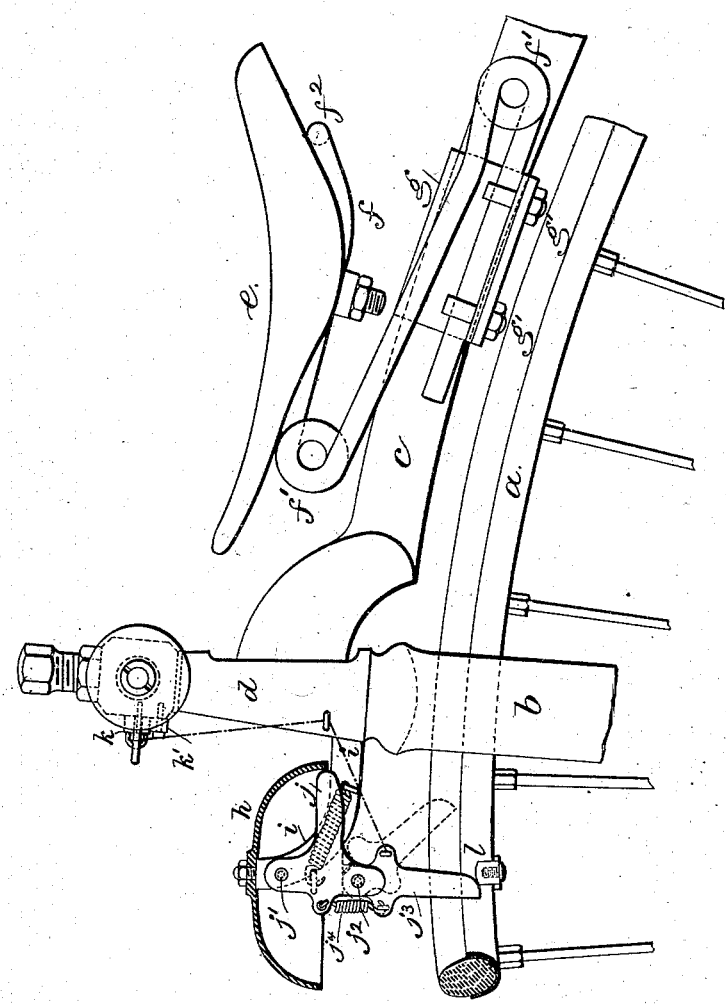
Witnesses
Chas H Smith
Harold Serrell
Inventor
John Harrington
per Lemuel W. Serrell
atty.

(No Model.) 2 Sheets—Sheet 2.
J. HARRINGTON.
Bicycle.
No. 240,905. Patented May 3, 1881.
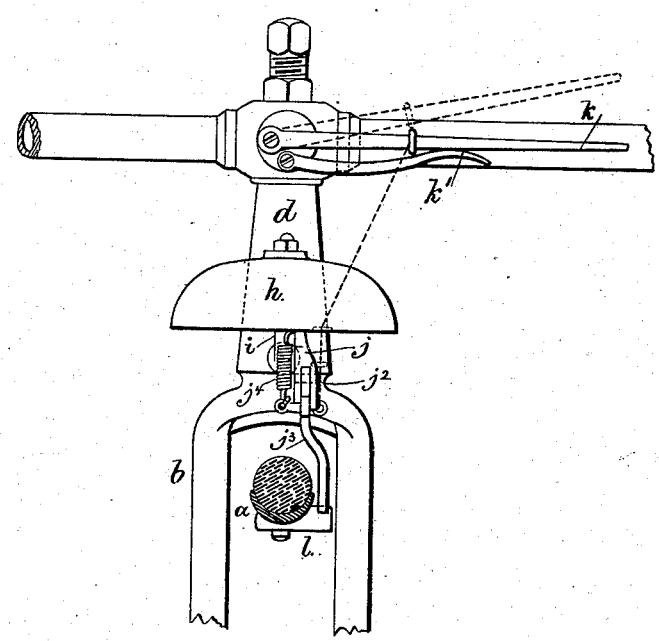
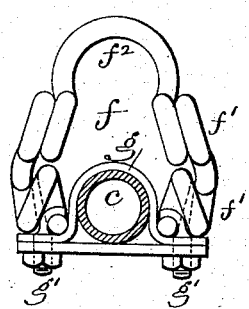
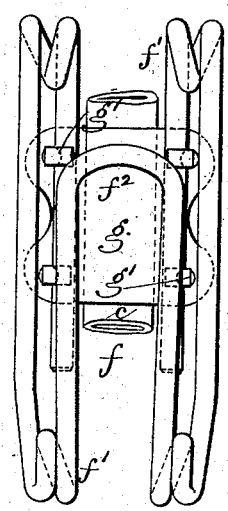
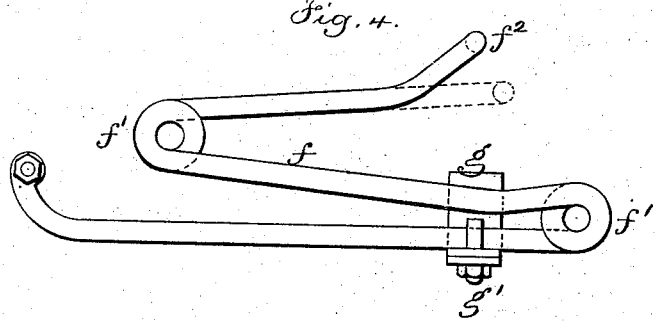
Witnesses
Chas. H. Smith
Harold Serrell
Inventor
John Harrington
for Lemuel W. Serrell
atty.

UNITED STATES PATENT OFFICE.

JOHN HARRINGTON, OF KENSINGTON, COUNTY OF MIDDLESEX, ENGLAND.

BICYCLE.

SPECIFICATION forming part of Letters Patent No. 240,905, dated May 3, 1881.

Application filed March 14, 1881. (No model.) Patented in England September 24, 1879.

*To all whom it may concern:*

Be it known that I, JOHN HARRINGTON, of 23 Scarsdale Villas, Kensington, England, have invented a new and useful Improvement in Springs for the Saddles and Seats of Bicycles and Tricycles, and in Alarm Apparatus for such Vehicles, and the following is a description of the same.

My invention has for its object improvements in springs for the saddles and seats of bicycles and tricycles, and in alarm apparatus for the same, and is the same as in English Patent granted to me September 24, 1879, No. 3,849.

The spring I form of a steel rod or wire bent into a double flattened Z form, and coiled completely around at each angle, so as to form a spring at such parts, in addition to the natural spring of the rod or wire. Each spring is of one continuous piece of rod or wire, and the two parts of such flattened Z are distant from each other a suitable space, but connected by the continuous rod or wire of which they are made passing from one to the other at the outer end of the upper member of the spring. The spring is fixed rigidly to the "spine" of the vehicle by clips which pass around said spine, and are secured together by bolting-pieces, which at the same time secure the spring and clip together. The halves of the spring are secured one at each side and outside of said spine, and the saddle is fixed to the upper member of the spring and is adjustable thereon.

I employ a similar spring arrangement for tricycles; but in that case, a seat being used instead of a saddle, I prefer to employ two springs.

My improved alarm apparatus consists of a gong or bell fixed in a convenient position, and provided with a hammer operated by a lever mounted on an axis of motion. The lower end of such lever, when the alarm is required to be sounded, is moved into position to be struck by projections fixed to the under side of the felly of the wheel and projecting a little beyond the edge of the same, and when not required such lever is held away from such projections by a suitable key or lever and spring.

In the drawings, Figure 1 is a side view of parts of a bicycle, representing my improved saddle-spring and alarm apparatus applied thereto, the gong being in section. Fig. 2 is a cross-section through the spine, showing the spring fixed thereon. Fig. 3 is a plan view of my spring. Fig. 4 is an elevation of a modified form of the same. Fig. 5 is a front elevation, showing the alarm apparatus and lever for operating the same.

$a$ represents part of the wheel; $b$, the fork; $c$, the spine; $d$, the head, and $e$ the saddle.

$f$ represents my improved saddle-spring, which I form of a steel rod or wire bent into a flattened Z form, and coiled completely around at each angle $f'$, so as to form a spring at such parts, in addition to the natural spring of the rod or wire. Each spring $f$ is formed of one continuous rod or wire, and is made of two such flattened Z parts, distant from each other a suitable space, but connected together by the continuous rod or wire of which they are made passing over from one part to the other at the outer end, $f^2$, of the upper member of the spring.

The saddle in use upon bicycles employing my spring is secured by the usual clamping-plate and tightening-bolts to the upper member of the spring $f$, and it is adjustable thereon. The two parts of the spring $f$ pass outside and at each side of the spine $c$, and said spring is secured to the spine $c$ by means of a clip, $g$, the upper half of which passes over said spine, and the lower half under it, and these parts are held together by bolts $g'$, which bolts have their upper end made hook-shaped, so that they perform the double duty of holding the parts of the clip together in clamping the spine $c$ and holding the spring $f$ to the clip $g$. The upper half of the clip $g$, I prefer to make to fit the contour of the spine $c$, and the lower part flat; but both parts may, if desired, be made to fit the contour of the spine.

In the modified form of spring shown in Fig. 4, I continue the lower member of the spring forward to where the reduced portion of the spine $c$ enters the bicycle-head, at which place a bolt secures said member to the spine, and in lieu of employing four bolts and a wide clip, $g$, I prefer to use a narrow clip and two bolts, as shown.

The upper member of the spring $f$ may be made straight or bent upwardly at the end, as shown in the drawings, Fig. 1.

In the case of tricycles, where a seat is used instead of a saddle, I prefer to employ two separate springs, placed side by side, to support the seat.

$h$ is a gong or bell, which is fixed to the head $d$ by a bracket, $i$. It is provided with a hammer, $j$, pin-jointed at $j'$ to the bracket $i$, and said hammer $j$ has jointed thereto at $j^2$ a lever, $j^3$, capable of moving on its axis in one direction, as shown by dotted lines, but rigid in the contrary direction.

When the rider desires to sound an alarm he depresses the key or lever $k$, near the handle of the machine, thereby allowing the lever $j^3$, which was in the position shown by dotted lines, to be returned by the spring $j^4$ to the position shown in full lines, and said spring retains the lever $j^3$ in said position so long as the lever $k$ is depressed by the rider; but when released by the rider the spring $k'$ returns the parts to their normal position, the lever $j^3$ then occupying the position shown by dotted lines. When the lever $j^3$ is in the position shown by the full lines it is in place to be moved by projections $l$, fixed to the under side of the felly of the wheel $a$, which operation causes the lever $j$ to strike the periphery of the gong and give an alarm. I prefer to fix about four or six of such projections to the wheel at equal distances apart, so as to strike the bell or gong a suitable number of times, in lieu of causing it to be struck by each alternate spoke of the wheel, as heretofore.

I claim as my invention—

1. In combination with the seat or saddle and the spine of the bicycle or tricycle, a spring of wire, folded in a flattened Z form, and coiled between one straight portion and the next, substantially as specified.

2. In combination with the saddle of a bicycle and the spine thereof, a spring, of one piece of metal, folded in a double Z form, coiled between one straight portion and the next, and the ends of the spring attached to the spine, substantially as specified.

3. In an alarm for bicycles and tricycles, the combination, with the gong, of a lever, $j^3$, key $k$, and spring, and the projections $l$ upon the felly of the wheel, substantially as specified.

Signed by me this 15th day of February, A. D. 1881.

JOHN HARRINGTON.

Witnesses:
　CHAS. BERKLEY HARRIS,
　JNO. DEAN,
Both of 17 Gracechurch Street, London.